(12) United States Patent
Yau et al.

(10) Patent No.: US 9,811,222 B2
(45) Date of Patent: Nov. 7, 2017

(54) SENSING STRUCTURE

(71) Applicant: Industrial Technology Research Institute, Hsinchu (TW)

(72) Inventors: Bao-Shun Yau, Kaohsiung (TW); Sheng-Feng Chung, Hsinchu (TW); Su-Tsai Lu, Hsinchu (TW); Yu-Ling Hsieh, Hsinchu (TW); Cheng-Yi Shih, Hsinchu (TW); Shu-Yi Chang, Kaohsiung (TW); Kuo-Hua Tseng, New Taipei (TW); Heng-Tien Lin, Hsinchu County (TW)

(73) Assignee: Industrial Technology Research Institute, Hsinchu (TW)

( * ) Notice: Subject to any disclaimer, the term of this patent is extended or adjusted under 35 U.S.C. 154(b) by 188 days.

(21) Appl. No.: 14/801,847

(22) Filed: Jul. 17, 2015

(65) Prior Publication Data

US 2016/0018348 A1 Jan. 21, 2016

Related U.S. Application Data

(60) Provisional application No. 62/026,020, filed on Jul. 17, 2014.

(30) Foreign Application Priority Data

Nov. 28, 2014 (TW) .............................. 103141420 A

(51) Int. Cl.
   *G06F 3/044* (2006.01)
(52) U.S. Cl.
   CPC .... *G06F 3/044* (2013.01); *G06F 2203/04112* (2013.01); *G06F 2203/04113* (2013.01)
(58) Field of Classification Search
   CPC .................. G06F 3/044; G06F 2203/04112
   (Continued)

(56) References Cited

U.S. PATENT DOCUMENTS 8,378,994 B2   2/2013  Maki
8,508,680 B2   8/2013  Geaghan et al.
(Continued)

FOREIGN PATENT DOCUMENTS

CN   102541318   7/2012
CN   103080876   5/2013
(Continued)

OTHER PUBLICATIONS

Kim et al., "Effect of ink cohesive force on gravure offset printing," Microelectronic engineering, Jul. 2014, pp. 587-589.
(Continued)

*Primary Examiner* — Patrick Assouad
*Assistant Examiner* — Khristopher Yodichkas
(74) *Attorney, Agent, or Firm* — JCIPRNET

(57) ABSTRACT

A sensing structure includes a sensing unit, a periphery circuit, and a connecting circuit. The connecting circuit connecting the sensing unit and the periphery circuit includes a connecting pattern. In an embodiment, the connecting pattern has at least two line widths. The line width of a part of the connecting pattern connecting the periphery circuit is greater than the line width of a part of the connecting pattern connecting the sensing unit. In an embodiment, the connecting pattern includes a mesh pattern having at least two mesh densities. The mesh density of a part of the mesh pattern connecting the periphery circuit is greater than the mesh density of a part of the mesh pattern connecting the sensing unit. In an embodiment, the connecting circuit includes lines between and connecting a single sensing series of the sensing unit and a periphery wire of the periphery circuit.

33 Claims, 12 Drawing Sheets

(58) Field of Classification Search
USPC .......................................................... 324/697
See application file for complete search history.

(56) References Cited

U.S. PATENT DOCUMENTS

| | | | |
|---|---|---|---|
| 8,586,874 B2 | 11/2013 | Kuriki | |
| 2007/0103446 A1 | 5/2007 | Chien et al. | |
| 2013/0043061 A1* | 2/2013 | Huang | G06F 3/041 174/250 |
| 2013/0278513 A1* | 10/2013 | Jang | G06F 3/044 345/173 |
| 2014/0055405 A1 | 2/2014 | Ma | |
| 2014/0160708 A1* | 6/2014 | Chu | H01L 23/49838 361/767 |
| 2016/0253036 A1* | 9/2016 | Yang | G09G 3/20 345/174 |

FOREIGN PATENT DOCUMENTS

| | | |
|---|---|---|
| TW | M428425 | 5/2012 |
| TW | I424348 | 1/2014 |
| TW | M472250 | 2/2014 |
| TW | M472893 | 2/2014 |
| TW | M472894 | 2/2014 |
| TW | 201422072 | 6/2014 |

OTHER PUBLICATIONS

Lee et al., "Development of a gravure offset printing system for the printing electrodes of flat panel display," Thin Solid Films, Apr. 2, 2010, pp. 3355-3359.

Ashwin et al., "Effect of viscoelasticity on liquid transfer during gravure printing," Journal of Non-Newtonian Fluid Mechanics, May 2012, pp. 64-75.

Choi et al., "A modified offset roll printing for thin film transistor applications," Microelectronic Engineering, Mar. 2012, pp. 93-97.

Lee et al., "Design and fabrication of printed transparent electrode with silver mesh," Microelectronic Engineering, Oct. 2012, pp. 556-560.

"Office Action of Taiwan Counterpart Application", dated Dec. 15, 2015, p. 1-p. 8, in which the listed references were cited.

* cited by examiner

SENSING STRUCTURE

CROSS-REFERENCE TO RELATED APPLICATION

This application claims the priority benefits of U.S. provisional application Ser. No. 62/026,020, filed on Jul. 17, 2014 and Taiwan application serial no. 103141420, filed on Nov. 28, 2014. The entirety of each of the above-mentioned patent applications is hereby incorporated by reference herein and made a part of this specification.

TECHNICAL FIELD

The disclosure relates to a sensing structure, and particularly relates to a sensing structure having a connecting circuit.

BACKGROUND

The development of displays is now focusing on a more user-friendly interface between human and machine. With the emergence of flat-panel displays, sensing panels have become the main stream and replaced input devices such as keyboards and mice. With the sensing panels, a variety of information equipment products become easier to use. Currently, based on the operation principles, the sensing panels can be roughly divided into capacitive, resistive, and optical sensing panels. The capacitive sensing panels are commonly used in mobile computing devices for its high sensitivity.

Generally speaking, to allow the sensing panel to offer a preferable visual effect, and in consideration of the transmittance and conductivity of sensing electrodes, the sensing electrodes are manufactured with fine grid lines. In other words, the sensing electrodes are formed by mesh-like, intersecting fine lines. However, since conductive lines in the periphery circuit are thicker, disconnection may easily occur in a transition area where lines are changed from finer ones to thicker ones when the finer conductive lines of the sensing electrodes are connected to the thicker conductive lines of the periphery circuit, making a qualified rate and a sensing ability of the sensing panel decrease.

SUMMARY

The disclosure provides a sensing structure having a preferable qualified rate and sensing ability.

The sensing structure of the disclosure includes a sensing unit, a periphery circuit, and a connecting circuit. The connecting circuit includes a connecting pattern and is configured to connect the sensing unit and the periphery circuit. The connecting pattern has at least two line widths, and the line width of a part of the connecting pattern that connects the periphery circuit is greater than the line width of a part of the connecting pattern that connects the sensing unit.

The sensing structure of the disclosure includes a sensing unit, a periphery circuit, and a connecting circuit. The connecting circuit includes a connecting pattern and is configured to connect the sensing unit and the periphery circuit. The connecting pattern includes a mesh pattern, the mesh pattern has at least two mesh densities, and the mesh density of a part of the mesh pattern that connects the periphery circuit is greater than the mesh density of a part of the mesh pattern that connects the sensing unit.

The sensing structure of the disclosure includes a sensing unit, a periphery circuit, and a connecting circuit. The sensing unit includes a single sensing series. The periphery circuit includes a periphery wire. The connecting circuit includes a plurality of first conductive lines. The first conductive lines are disposed between the single sensing series and the periphery wire and connect the single sensing series and the periphery wire.

Based on above, the disclosure adopts the connecting pattern having the line width at the part that connects the periphery circuit greater than the line width at the part that connects the sensing unit, the connecting pattern having the mesh density at the part that connects the periphery circuit greater than the mesh density at the part that connects the sensing unit, or the connecting pattern including multiple connecting lines disposed between the sensing unit and the periphery circuit. In this way, the issue of disconnection that occurs when the lines are changed from thicker ones to finer ones or from finer ones to thicker ones may be solved, thereby allowing the sensing structure to have a preferable qualified rate and sensing ability.

In order to make the aforementioned and other features and advantages of the disclosure comprehensible, several exemplary embodiments accompanied with figures are described in detail below.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

DETAILED DESCRIPTION OF DISCLOSED EMBODIMENTS

To make the purposes, technical solutions, and advantages of the disclosure more clear and understandable, the disclosure is described in detail in the following with embodiments and reference to accompanying drawings.

Figure 1A:
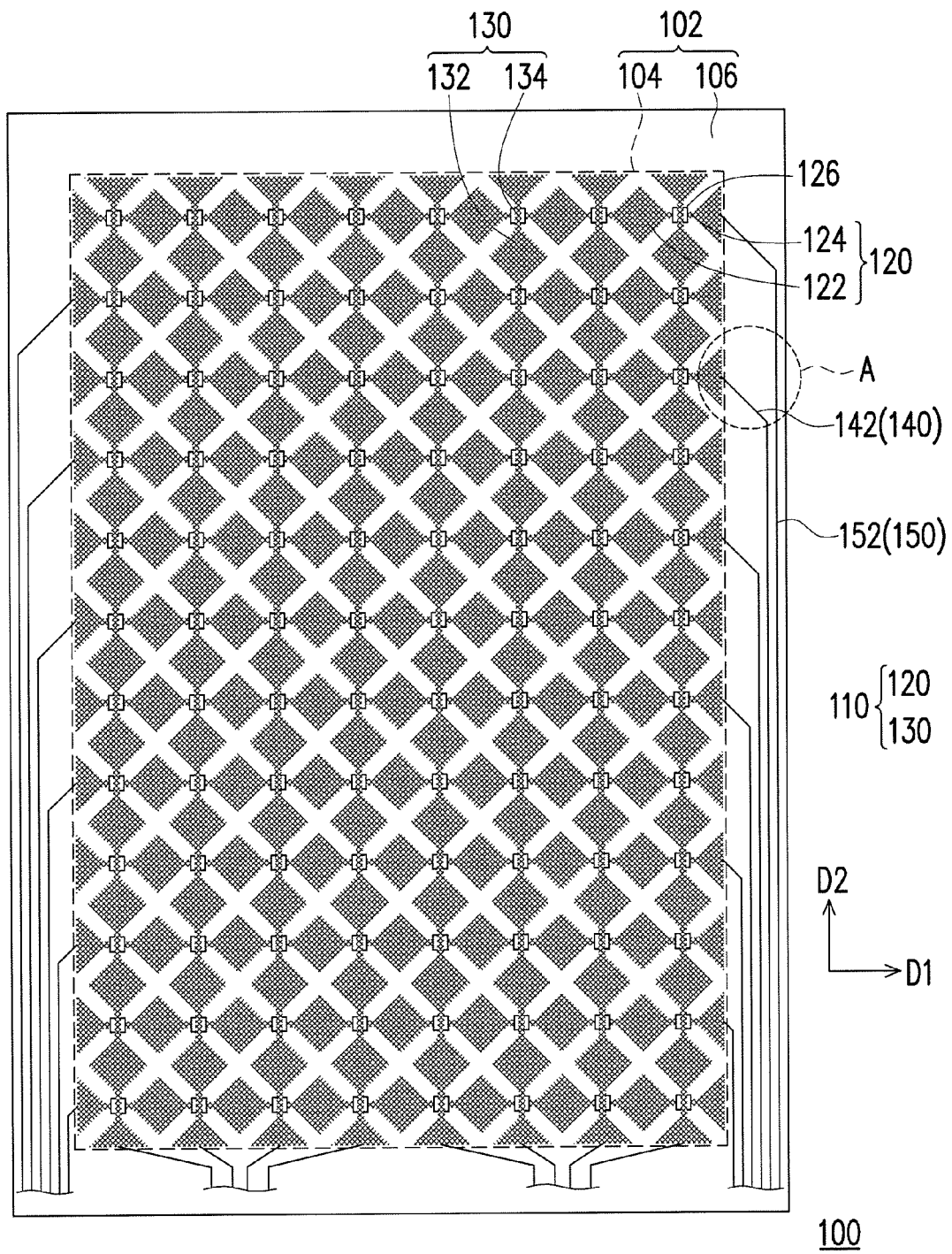
FIG. 1A is a schematic view illustrating a sensing structure according to an embodiment of the disclosure.
Figure 1B:
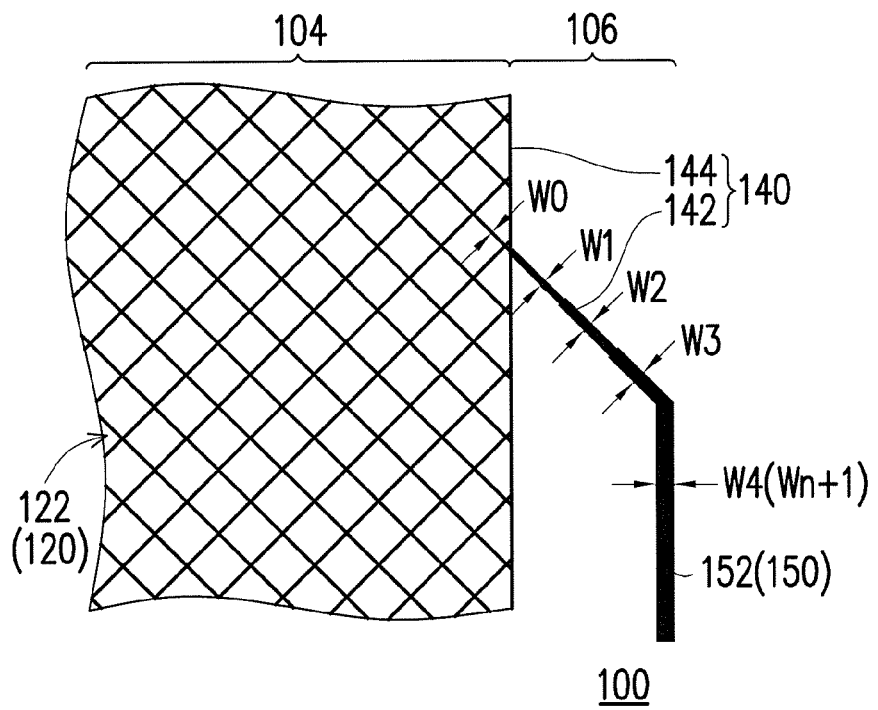
FIG. 1B is an enlarged view of an area A of FIG. 1A.

FIG. 1A is a schematic view illustrating a sensing structure according to an embodiment of the disclosure, and FIG. 1B is an enlarged view of an area A of FIG. 1A. Here, FIG. 1A merely illustrates an overall framework of the sensing structure and locations of the components, exemplary structures and connections for a sensing unit, a connecting circuit, and a periphery circuit may be referred to FIG. 1B. Referring to FIGS. 1A and 1B together, a sensing structure 100 includes a sensing unit 110, a connecting circuit 140, and a periphery circuit 150. The sensing structure 100 is disposed on a substrate 102. The substrate 102 includes a sensing area 104 and a frame area 106, for example. The frame area 106 surrounds the sensing area 104. The sensing unit 110 is disposed in the sensing area 104, for example, and the connecting circuit 140 and the periphery circuit 150 are disposed in the frame area 106, for example. In this embodiment, the substrate 102 may be a rigid substrate such as a glass substrate, etc., or a flexible substrate such as a substrate formed of thin glass or a polymer material, etc. In general, a bending radius of the substrate 102 is less than 100 mm. In this embodiment, the sensing unit 110 is in a visible area, for example, while the connecting circuit 140 and the periphery circuit 150 are in an invisible area, for example. However, the disclosure is not limited thereto. In another embodiment, the connecting circuit 140 may also be in the visible area.

In this embodiment, the sensing unit 110 includes a plurality of sensing series 120 and 130, for example. The sensing series 120 extends in a direction D1 and includes a plurality of mesh electrodes 122 and a plurality of bridging lines 124. The bridging lines 124 are disposed between adjacent mesh electrodes 122. The sensing series 130 extends in another direction D2 and includes a plurality of mesh electrodes 132 and a plurality of bridging lines 134. The bridging lines 134 are disposed between adjacent mesh electrodes 132. The sensing series 120 and the sensing series 130 intersect each other, and the sensing series 120 and the sensing series 130 are insulated from each other. In this embodiment, insulating patterns 126 are disposed at positions where the sensing series 120 and the sensing series 130 intersect, namely positions between the bridging lines 124 and the bridging lines 134, for example. In this embodiment, the direction D1 is X direction, for example, and the direction D2 is Y direction, for example. The direction D1 and the direction D2 are perpendicular to each other, for example. However, the disclosure is not limited thereto. In this embodiment, a line width W0 of each of the mesh electrodes 122 and 132 is less than or equal to 5 μm, for example. In this way, the sensing area 104 may have a preferable light transmittance. In this embodiment, a minimum distance between median lines of grid lines, which are adjacent and parallel, of a mesh pattern is defined as a pitch, and the mesh electrodes 122 and 132 have a pitch P0. The pitch P0 is greater than the line width W0. In this embodiment, the pitch P0 is in a range from 0.1 mm to 1 mm, for example. It should be noted that the number, shapes, grid lines and forms of mesh patterns of the mesh electrodes 122 and 132 may be modified arbitrarily. For example, the grid lines may also be curved lines.

The periphery circuit 150 includes a plurality of periphery wires 152, for example, and each of the periphery wires 152 is connected to one of the sensing series 120 and 130. In other words, the periphery wires 152 and the sensing series 120 and 130 have one-to-one correspondence. In this embodiment, each of the periphery wires 152 has a line width W(n+1), for example. The periphery wires 152 are solid lines rather than have mesh-like patterns, for example. The line width W(n+1) of each of the periphery wires 152 may be designed according to a requirement of resistance. Generally speaking, a line width less than 20 μm meets a requirement of slim bezel while satisfies the requirement of low resistance.

The connecting circuit 140 includes a connecting pattern 142 for connecting the sensing unit 110 and the periphery circuit 150. In addition, the connecting pattern 142 has at least two line widths W1 . . . Wn. Also, the line width Wn at a part connecting the periphery circuit 150 is greater than the line width W1 at a part connecting the sensing unit 110. In this embodiment, the line widths W1 . . . Wn gradually increase from the sensing unit 110 toward the periphery circuit 150. In addition, n is an integer greater than 1. In this embodiment, the connecting pattern 142 is a conductive line, for example, and the line widths W1 . . . Wn of the conductive line gradually increase from the sensing unit 110 toward the periphery circuit 150. The connecting pattern 142 is configured to connect one of the sensing series 120 and 130. In other words, the connecting pattern 142 and the sensing series 120 or 130 are in a one-to-one corresponding relation. The line widths W1 . . . Wn of the connecting pattern 142 range between the line width W0 of the mesh electrode 122 or 132 and the line width Wn+1 of the periphery wire 152. In other words, the line widths W1 . . . Wn of the connecting pattern 142 are greater than or equal to the line width W0 of the mesh electrode 122 or 132 and smaller than or equal to the line width Wn+1 of the periphery wire 152, namely W0≤W1 . . . Wn≤Wn+1, but not including W0=W1= . . . =Wn=Wn+1.

The connecting pattern 142 has the line widths W1 . . . Wn that change progressively. The progressively changing line widths W1 to Wn may change in accordance with a rule of progression. The mesh electrode 122 has the line width W0, the connecting pattern 142 has the line widths W1 . . . Wn, and the periphery wire 152 has the line width Wn+1. In addition, (Wn−W(n−1))=d, and d is a constant greater than zero. In this embodiment, (W(n+1)−Wn) is also equal to d, for example. For example, as shown in FIG. 1B, when n=3 and d=4 μm, W0=4 μm, W1=8 μm, W2=12 μm, W3=16 μm, and W4=20 μm. Namely, the line width W0 of the mesh electrode 122 is 4 μm, the line widths W1, W2, and W3 of the connecting pattern 142 are 8 μm, 12 μm, and 16 μm, and the line width W4 of the periphery wire is 20 μm.

The progressively changing line widths W1 . . . Wn may also change progressively but irregularly. In other words, (Wn−W(n−1))=d, and d is greater than 0 but is not a constant. For example, when n=4, W0=5 μm, W1=6 μm, W2=8 μm, W3=12 μm, W4=18 μm, and W5=20 μm. Namely, the line width W0 of the mesh electrode 122 is 5 μm, the line widths W1, W2, W3, and W4 are 6 μm, 8 μm, 12 μm, and 18 μm, and the line width W5 of the periphery wire 152 is 20 μm.

The progressively changing line widths W1 . . . Wn may also change continuously. In other words, (Wn−W(n−1))=d, d is close to zero, and n is close to infinite. For example, W0=5 μm, W1=5.001 μm, W2=5.005 μm, W3=5.009 μm, W4=5.012 μm, and so on so forth, until Wn+1=20 μm. Namely, the line width W0 of the mesh electrode 122 is 5 μm, the line widths W1 . . . Wn of the connecting pattern 142 are greater than 5 μm and change continuously within a range of being less than or equal to 20 μm, and the line width Wn+1 of the periphery wire 152 is 20 μm.

In this embodiment, the connecting circuit 140 further includes at least one conductive line 144, for example. The conductive line 144 is disposed at a terminal part of the mesh electrode 122 or 132, so as to connect the sensing unit 110 and the connecting pattern 142. In this embodiment, the conductive line 144 is connected to ends of the grid lines of the mesh electrode 122 or 132, and the conductive line 144 does not overlap the mesh electrode 122 or 132. A line width of the conductive line 144 is uniform, for example, and the line width of the conductive line 144 is equal to or greater than the line width W0 of the mesh electrode 122 or 132 and equal to or smaller than the minimum line width W1 of the connecting pattern 142. In this embodiment, the line widths W1, W2, and W3 of the conductive line 144 are equal to the line width W0 of the mesh electrode 122 or 132.

Figure 1C:
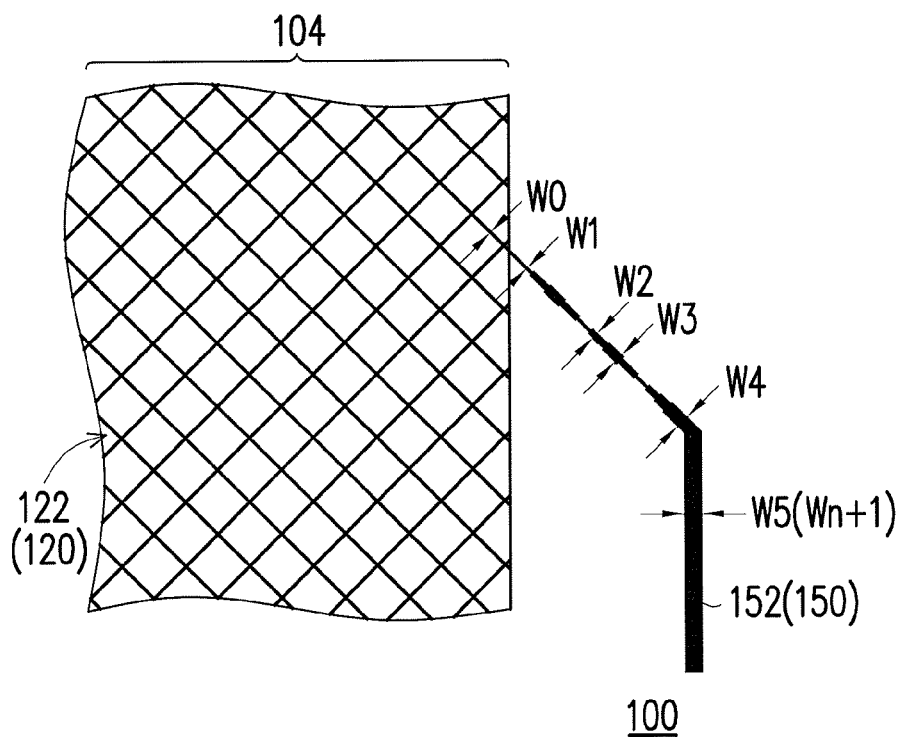
FIG. 1C is a partial schematic view illustrating a sensing structure according to an embodiment of the disclosure.

In this embodiment, the connecting pattern 142 between the sensing unit 110 and the periphery circuit 150 is described as having the progressively changing line width as an example. However, the disclosure is not limited thereto. Accordingly, as shown in FIG. 1C, it only requires in the connecting pattern 142 that the line width Wn (W4) at the part that connects the periphery circuit 150 is greater than the line width W1 at the part that connects the sensing unit 110. The line widths W1, W2, W3, and W4 of the connecting pattern 142 between the sensing unit 110 and the periphery circuit 150 may also exhibit a sawtooth-like change.

Figure 2:
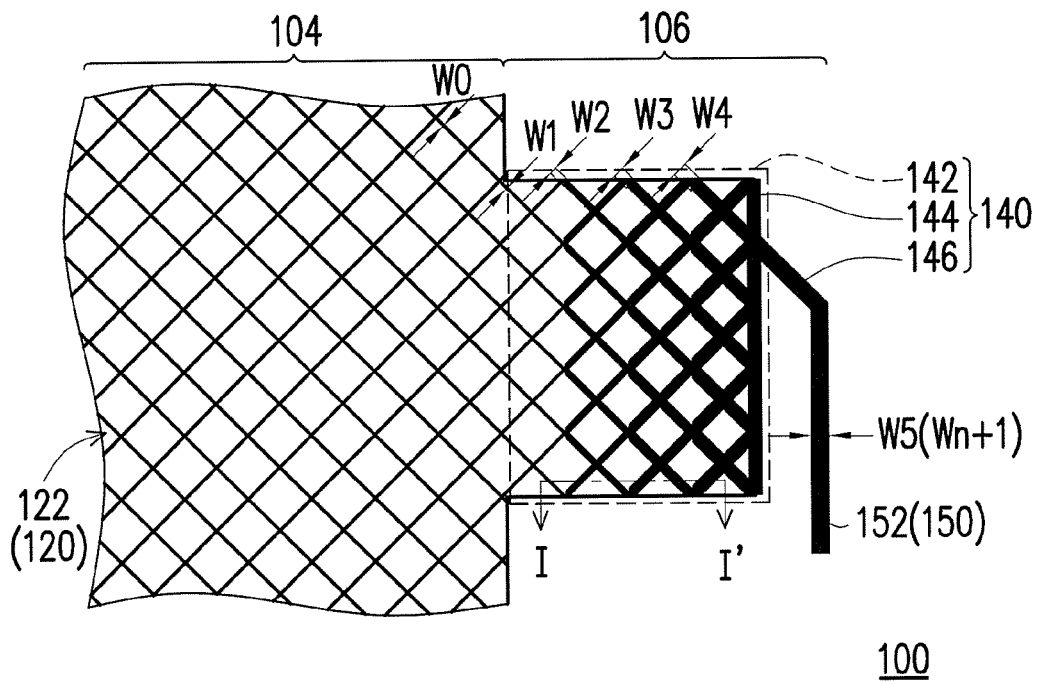
FIG. 2 is a partial schematic view illustrating a sensing structure according to an embodiment of the disclosure.

In this embodiment, the connecting pattern 142 is described as a conductive line, for example. However, the disclosure is not limited thereto. Referring to FIG. 2, in the sensing structure 100 of this embodiment, the connecting pattern 142 is a mesh pattern, and the line width Wn at the part that connects the periphery circuit 150 is greater than the line width W1 at the part that connects the sensing unit 110. In this embodiment, the line widths W1 . . . Wn of the mesh pattern 142 may gradually increase from the sensing unit 110 toward the periphery circuit 150. However, the disclosure is not limited thereto. In other words, the mesh pattern may have the progressively changing line widths W1 . . . Wn of the embodiment corresponding to FIG. 1B, or may have the line widths W1 . . . Wn that change in a way similar to the sawtooth-like change of the embodiment corresponding to FIG. 1C. In this embodiment, the minimum line width W1 of the connecting pattern 142 is the same as the line width W0 of the mesh electrode 122, for example, and the maximum line width Wn of the connecting pattern 142 is the same as the line width W(n+1) of the periphery circuit 150, for example. For example, the line width W0 of the mesh electrode 122 is 4 μm, for example, the line widths W1, W2, W3, and W4 of the connecting pattern 142 are 5 μm, 10 μm, 15 μm, and 20 μm, for example, and the line width W5 of the periphery wires 152 is 20 μm, for example. Moreover, in an embodiment, the minimum line width W1 of the connecting pattern 142 may be greater than the line width W0 of the mesh electrode 122. For example, W0 is 4 μm, the line widths W1, W2, W3, and W4 of the connecting pattern 142 are 8 μm, 12 μm, 16 μm, and 20 μm, for example, and the line width W5 of the periphery wires 152 is 20 μm. Of course, in an embodiment, the maximum line width Wn of the connecting pattern 142 may also be different from the line width W(n+1) of the periphery wire 152.

In addition, the minimum distance between median lines of grid lines, which are adjacent and parallel, of the connecting pattern 142 is defined as the pitch P. In this embodiment, the pitch P is a constant, and the pitch P is greater than each of the line widths W1 . . . Wn of the mesh pattern 142. The pitch P is 300 μm, for example. The mesh pattern of the connecting pattern 142 and mesh pattern of the mesh electrode 122 or 132 are connected and substantially integrally formed, but the minimum line width W1 of the connecting pattern 142 is greater than or equal to the line width W0 of the mesh electrode 122 or 132. In other words, the sensing series 120 or 130 and the connecting pattern 142 are substantially formed by a continuous mesh pattern. In addition, a line width of the mesh pattern gradually increases from the sensing area 104 to the frame area 106.

The connecting circuit 140 further includes at least one conductive line 144 and at least one conductive line 146, for example. The conductive line 144 is located at a terminal part of the connecting pattern 142, so as to connect ends of grid lines of the connecting pattern 142 and the conductive line 146. The conductive line 146 is located between the conductive line 144 and the periphery wire 152, so as to connect the conductive line 144 and the periphery wire 152. The conductive lines 144 and 146 are integrally formed, for example, and line width of each of the conductive lines 144 and 146 is greater than or equal to the maximum line width Wn of the connecting pattern 142 and smaller than or equal to the line width Wn+1 of the periphery wire 152, for example. In this embodiment, the line width of each of the conductive lines 144 and 146 and the maximum line width W3 of the connecting pattern 142 are the same, for example. However, in another embodiment, the line width of the conductive line 144 may be greater than the maximum line width W3 of the connecting pattern 142, and the line width of the conductive line 146 may also be greater than the line width of the conductive line 144, or the line width of the conductive line 146 may also gradually increase from the sensing unit 110 toward the periphery circuit 150. In other words, all line widths of the connecting circuit 140 may gradually increase in a direction from the sensing area 104 toward the frame area 106.

It should be noted in particular that, while the above embodiments show that the connecting pattern 142 is configured to connect the sensing series 120 and the periphery circuit 150 as examples, however, the connecting pattern 142 may also be configured to connect the sensing series 130 and the periphery circuit 150.

Figure 3:
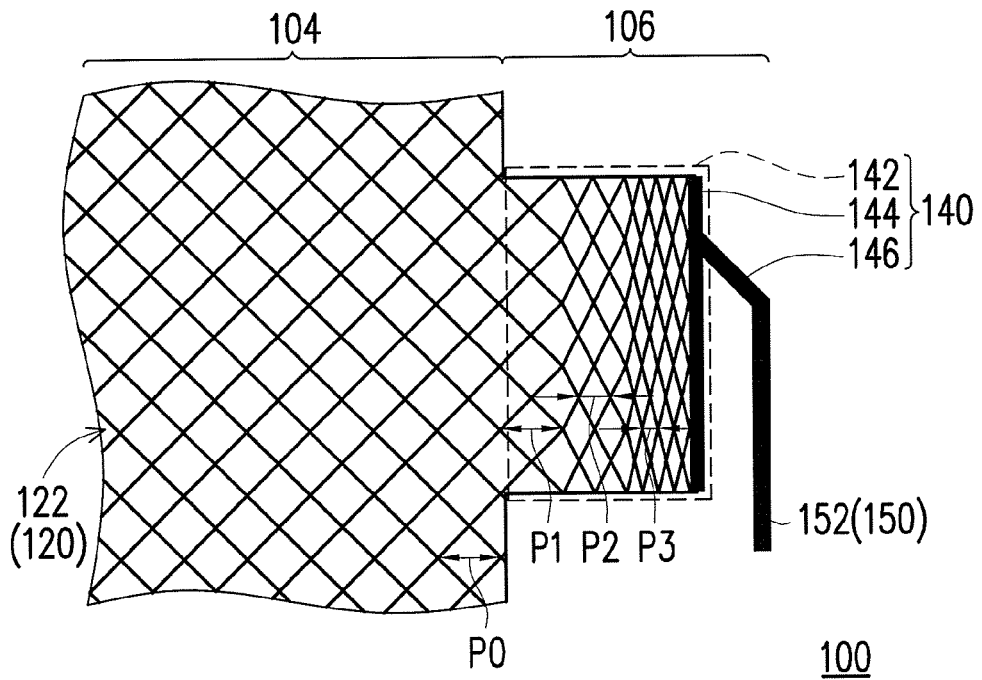
FIG. 3 is a partial schematic view illustrating a sensing structure according to an embodiment of the disclosure.

FIG. 3 is a partial schematic view illustrating a sensing structure according to an embodiment of the disclosure. In general, the sensing structure 100 shown in FIG. 3 is similar to the sensing structure 100 shown in FIG. 2, but the two structures mainly differ in configurations of the connecting pattern 142. Thus, the following description and FIG. 3 mainly focus on the connecting pattern 142, and the remaining components may be referred to the preceding description and will not be reiterated in the following. Referring to FIG. 3, in the sensing structure 100, the connecting circuit 140 includes the connecting pattern 142 for connecting the sensing unit 110 and the periphery circuit 150. In addition, the connecting pattern 142 is a mesh pattern, and the mesh pattern has at least two mesh densities. A mesh density at the part connecting the periphery circuit 150 is greater than a mesh density at the part connecting the sensing unit 110. In this embodiment, the mesh densities of the mesh pattern gradually increase from the sensing unit 110 toward the periphery circuit 150. In this embodiment, a minimum mesh density of the mesh pattern of the connecting pattern 142 is greater than or equal to a mesh density of the mesh pattern of the mesh electrode 122. In other words, the mesh pattern of the connecting pattern 142 and the mesh electrode 122 or 132 are connected and substantially integrally formed. However, the mesh densities of the mesh pattern gradually increase from the sensing area 104 to the frame area 106. In other words, the mesh pattern becomes denser from the sensing area 104 to the frame area 106.

The mesh pattern of the connecting pattern 142 has at least two pitches P(m−1) and P(m). In addition, m is a positive integer greater than 1. In other words, the connecting pattern 142 has the pitches P(−1) and P(m) that change progressively. The progressively changing pitches P(−1) and P(m) may change in accordance with a rule of progression. The mesh electrode 122 has the pitch P0, and the connecting pattern 142 has the pitches P(m−1) and P(m). In addition, P(m−1) is greater than P(m), P(−1)−P(m)=s, and s is a constant. For example, when n=3 and s=200, P0=500 μm, P1=500 μm, P2=300 μm, and P3=100 μm. Namely, the pitch P0 of the mesh electrode 122 is 500 μm, the pitches P1, P2, and P3 of the connecting pattern 142 are 500 μm, 300 μm, and 100 μm. In this embodiment, the line widths of the mesh electrode 122 and the connecting pattern 142 are the same, for example. Namely, W0=W1=5 μm, and the line width Wn+1 of the periphery wire 152 is 20 μm.

In an embodiment, the progressively changing pitches P(m−1) and P(m) may change progressively and irregularly. Namely, (P(m−1)−P(m))=s, but s is not equal to a constant. For example, P0=500 μm, P1=400 and P2=100 pm. In an embodiment, the progressively changing pitches P(m−1) and P(m) may continuously change. Namely, (P(m−1)−P(m))=s, s is close to zero, and m is close to infinite. In an embodiment, the minimum pitch P(1) of the grid lines may be the same as the pitch P(0) of the mesh electrode 122.

In this embodiment, the line width of the connecting pattern 142 may be uniform, for example. In an embodiment, the line widths of the connecting pattern 142 may gradually increase from the sensing unit 110 toward the periphery circuit 150. For example, P0=500 μm, P1=300 μm, P2=100 μm, and d=5, W0=5 μm, W1=10 μm, W2=15 μm, W3=20 μm, and W4=20 μm. Of course, in another embodiment, d may be a non-constant. For example, W0=5 μm, W1=6 μm, W2=8 μm, W3=12 μm, and W4=20 μm.

In this embodiment, the mesh pattern of the connecting pattern 142 is described as having the mesh densities that gradually become denser from the sensing unit 110 to the periphery circuit 150 as an example. However, the disclosure is not limited thereto. In another embodiment, the mesh pattern of the connecting pattern 142 may also change in other ways. For example, the mesh densities of the mesh pattern of the connecting pattern 142 may increase, decrease, and then increase from the sensing unit 110 to the periphery circuit 150.

Figure 4:
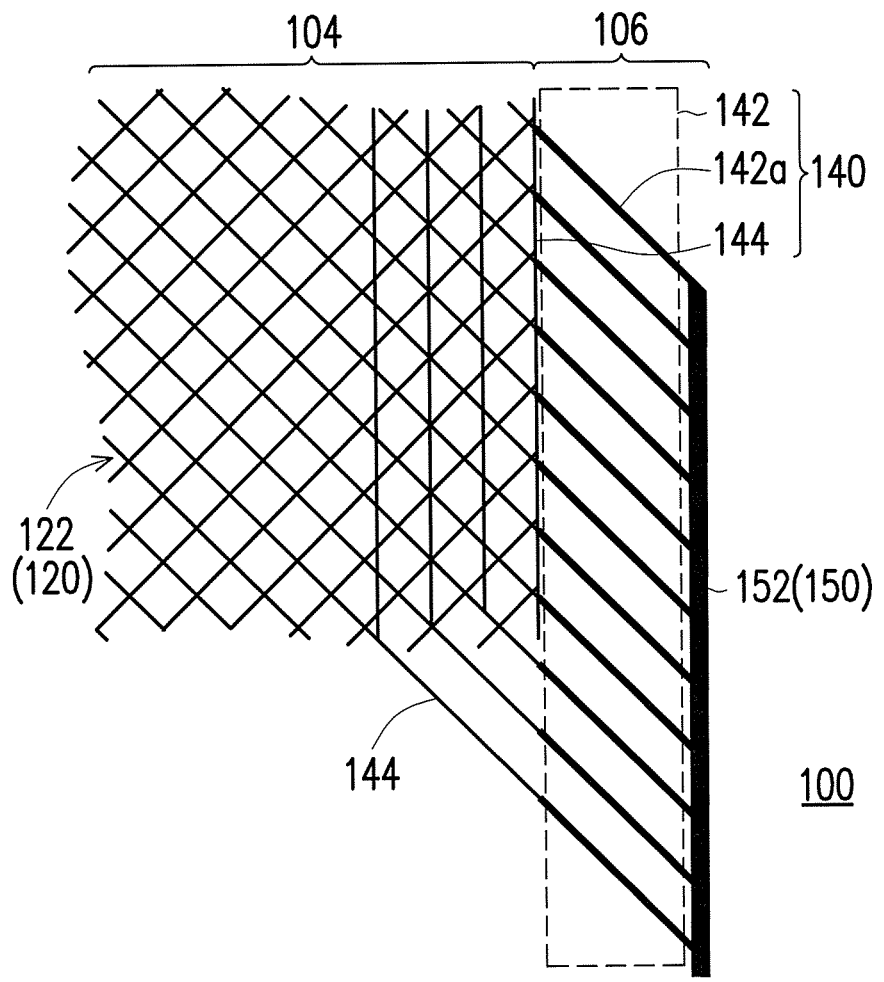
FIG. 4 is a partial schematic view illustrating a sensing structure according to an embodiment of the disclosure.

FIG. 4 is a partial schematic view illustrating a sensing structure according to an embodiment of the disclosure. In general, the sensing structure 100 shown in FIG. 4 is similar to the sensing structure 100 shown in FIG. 1, but the two structures mainly differ in the connecting circuit 140. Thus, the following description and FIG. 4 focus on the connecting circuit 140, and the remaining components may be referred to the preceding description and will not be reiterated in the following. Referring to FIG. 4, in the connecting circuit 140 of the sensing structure 100, the connecting pattern 142 includes a plurality of connecting lines 142a. The connecting lines 142a are configured between and connect the sensing series 120 and the periphery wire 152. In other words, a single sensing series 120 is connected to the periphery wire 152 through the connecting lines 142a. Therefore, the connecting pattern 142 having the connecting lines 142a may also be termed as a multi-channel structure. In addition, in this embodiment, the connecting circuit 140 may further include at least one conductive line 144, for example. The conductive line 144 is disposed at the terminal parts of the mesh electrodes 122 or 132, so as to connect the sensing unit 110 and the connecting lines 142a. In this embodiment, the connecting circuit 140 is described as including a plurality of the conductive lines 144, and one of the conductive lines 144 is connected to an end of the mesh electrode 122 without overlapping the mesh electrode 122, while remaining of the conductive lines 144 overlap the terminal part of the mesh electrode 122, for example.

Figure 5:
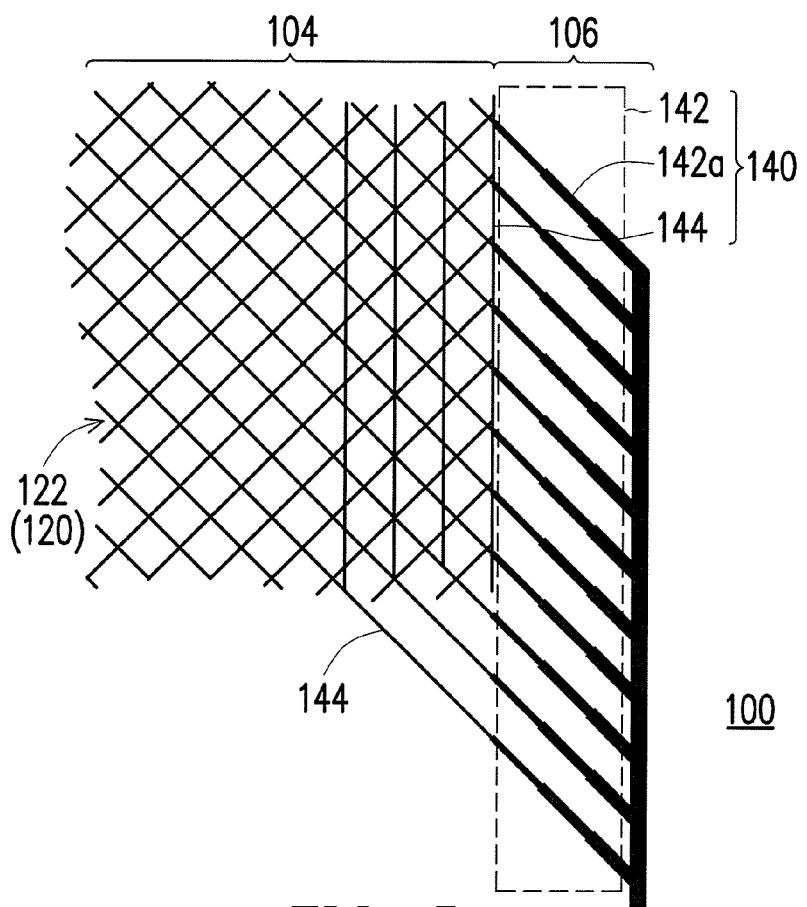
FIG. 5 is a partial schematic view illustrating a sensing structure according to an embodiment of the disclosure.

In this embodiment, the connecting line 142a has a uniform line width. However, the disclosure is not limited thereto. In another embodiment shown in FIG. 5, in the connecting circuit 140 of the sensing structure 100, the line widths W1 . . . Wn of each of the connecting lines 142a may also increase from the sensing unit 110 toward the periphery circuit 150, and each of the line widths W1 . . . Wn of the connecting line 142a is smaller than or equal to the line width of the periphery wire 152. The description about the line widths W1 . . . Wn may be referred to the description above, and will not be reiterated in the following.

In the above embodiment, the sensing series 120 and the sensing series 130 are disposed on the same surface of the substrate 102, for example. In addition, the mesh electrodes 122, the bridging lines 124, and the mesh electrodes 132 are formed by the same mesh-like conductive layer, while the bridging lines 134 are formed by another mesh-like conductive layer. In this embodiment, the mesh electrodes 122, the bridging lines 124, the mesh electrodes 132, the connecting patterns 142, and the periphery wires 152 are formed by gravure off-set printing, ink-jet printing, or nano-imprinting. The method of manufacturing the insulating patterns 126 includes gravure off-set printing, ink-jet printing, nano-imprinting, or screen-printing. The method of manufacturing the bridging lines 134 includes gravure off-set printing, ink-jet printing, nano-imprinting, or screen-printing.

Figure 6:
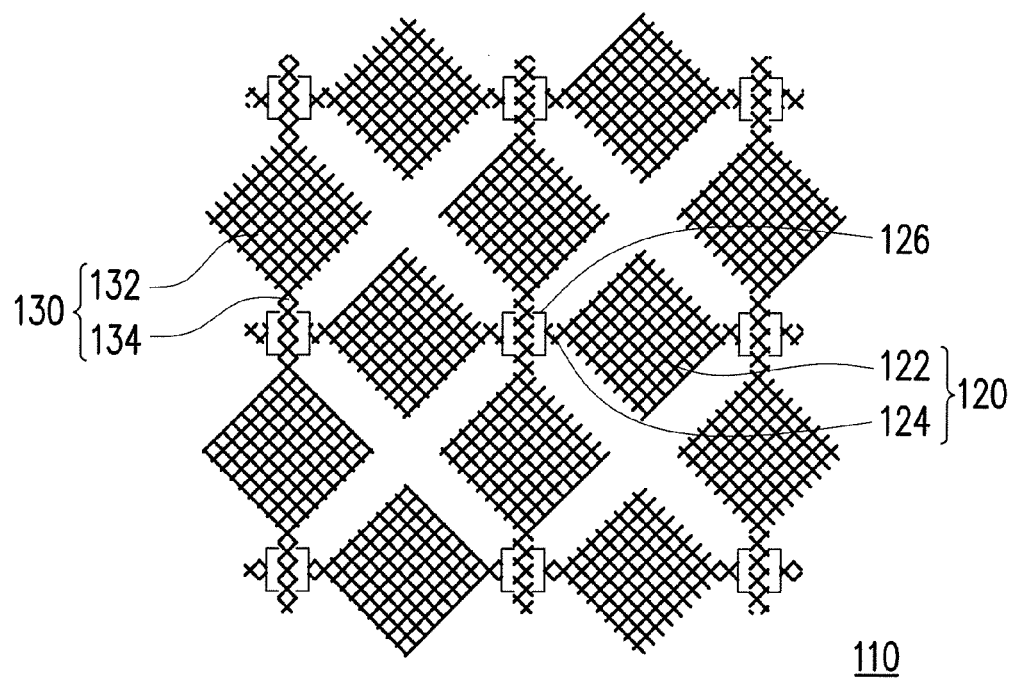
FIG. 6 is a schematic view illustrating a sensing structure according to an embodiment of the disclosure.

In another embodiment, as shown in FIG. 6, the sensing series 120 may be formed of a mesh-like conductive layer, while the sensing series 130 may be formed of another mesh-like conductive layer. Namely, the mesh electrodes 122 and the bridging lines 124 are substantially integrally formed, and the mesh electrodes 132 and the bringing lines 134 are substantially integrally formed. In addition, the sensing series 120 and the sensing series 130 may be disposed on the same surface of the substrate 102. In addition, the insulating patterns 126 are disposed between the sensing series 120 and the sensing series 130. Besides, in an embodiment (not shown), the sensing series 120 and the sensing series 130 may be disposed on opposite surfaces of the same substrate, or the sensing series 120 and the sensing series 130 may be disposed on different substrates and then adhered. Moreover, the sensing unit may be a sensing structure of other types, such as strip-like sensing electrodes that are alternately arranged. In other words, the connecting circuit is suitable to be disposed between various sensing units and the periphery circuit, so as to connect the sensing unit and the periphery circuit.

Figure 7A:
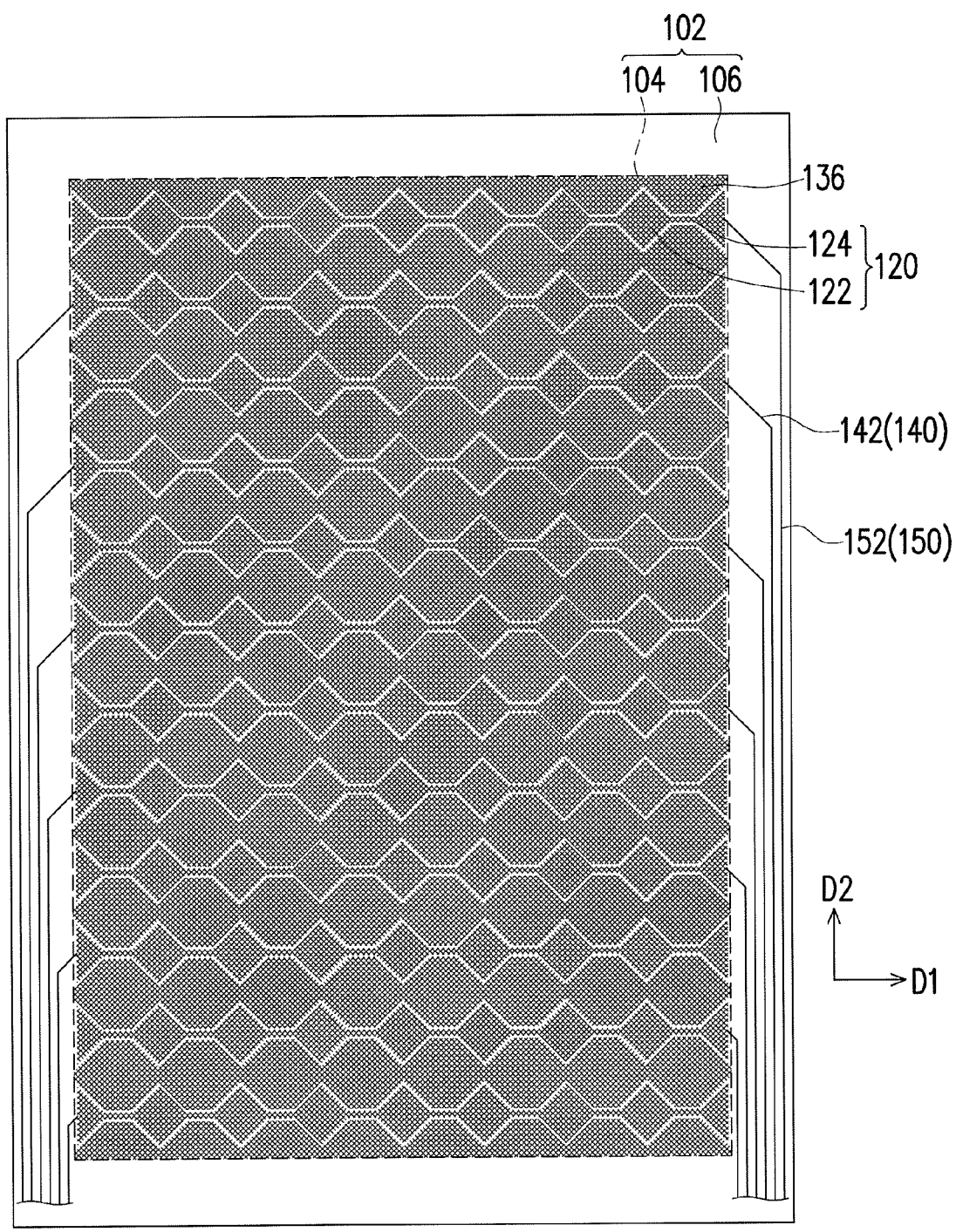
FIGS. 7A and 7B are schematic views illustrating a sensing structure according to an embodiment of the disclosure.
Figure 7B:
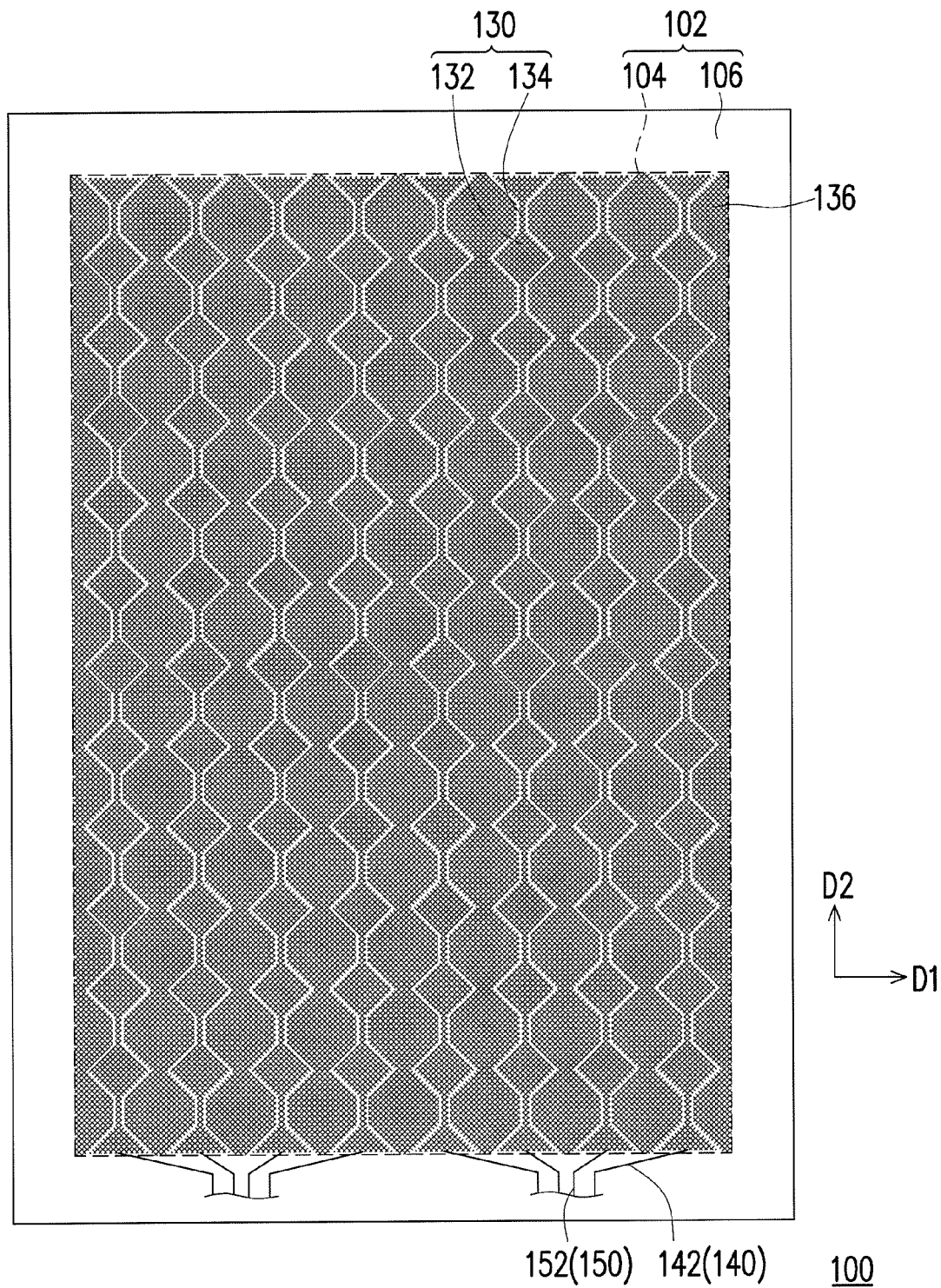
Figure 7C:
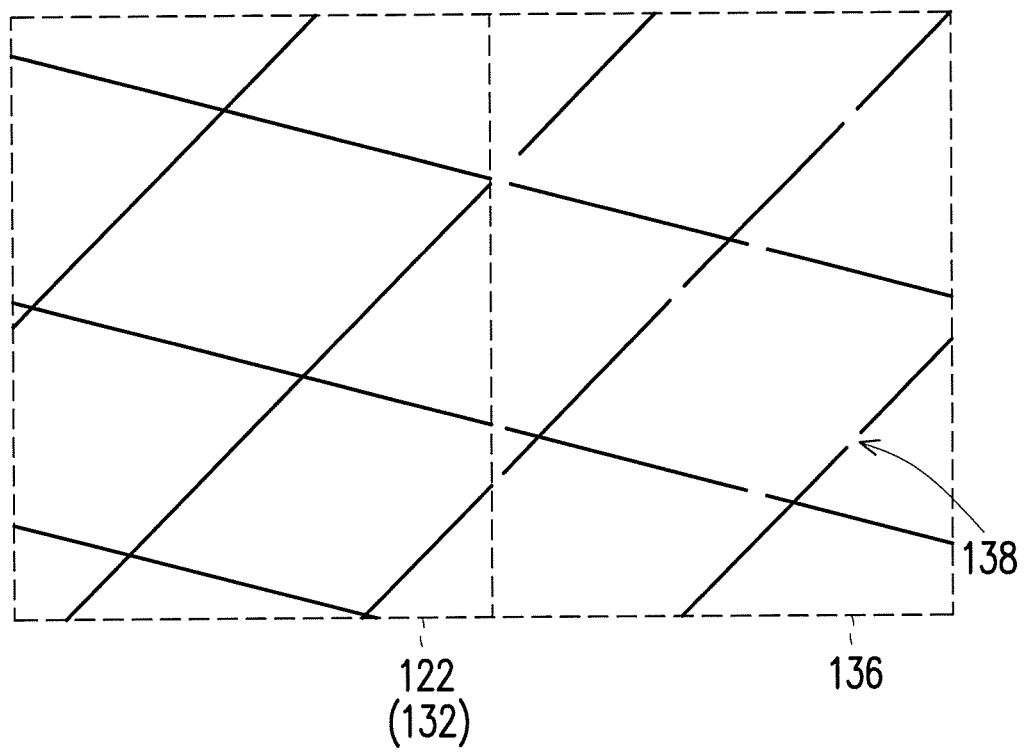
FIG. 7C is a partial enlarged view of FIGS. 7A and 7B.

FIGS. 7A and 7B are schematic views illustrating a sensing structure according to an embodiment of the disclosure, and FIG. 7C is a partial enlarged view of FIGS. 7A and 7B. Referring to FIGS. 7A to 7C at the same time, in the sensing structure 100 of this embodiment, to reduce a visibility of the mesh electrodes 122 and 132, the sensing unit 110 further includes dummy electrodes 136. The dummy electrodes 136 are disposed between the mesh electrodes 122 and the mesh electrodes 132. In addition, the dummy electrodes 136 are disposed in an electrically floating state. In this embodiment, the dummy electrode 136 has a mesh structure, for example. In other words, the mesh electrodes 122 and 132 and the dummy electrodes 136 may be formed of the same mesh-like conductive layer, and the conductive layer has a plurality of disconnected parts 138, making the dummy electrodes 136 electrically insulated from the mesh electrodes 122 and 132. For example, the sensing unit 110, the connecting circuit 140, and the periphery circuit 150 are formed together by performing a direct printing process. In addition, the sensing unit 110 is a mesh-like conductive layer having a plurality of disconnected parts. A width of the disconnected part 138 is about 5 μm to 10 μm. In this embodiment, the sensing series 120, the sensing series 130, and the dummy electrodes 136 are described as being disposed on the same surface of the substrate 102, for example. However, the disclosure is not limited thereto. For example, when the sensing series 120 and the sensing series 130 are disposed on a first surface of the substrate 102, or the sensing series 120 and the sensing series 130 are respectively disposed on the first surface and a second surface of the substrate 102, the dummy electrodes 136 may all be disposed on the first surface or the second surface of the substrate. Alternatively, a part of the dummy electrodes 136 are disposed on the first surface of the substrate, and another part of the dummy electrodes 136 are disposed on the second surface of the substrate. In other words, the dummy electrodes 136 are only required to be spatially disposed between the mesh electrodes 122 and 132, and may be disposed on a surface same as or different from the surface where the mesh electrodes 122 and 132 are disposed. In this embodiment, since the dummy electrodes 136 are disposed between the mesh electrodes 122 and 132, the sensing structure 100 has preferable optical properties.

In the previous embodiment, the sensing unit 110, the connecting circuit 140, and the periphery circuit 150 in the sensing structure 100 are integrally formed, for example. Thus, the sensing unit 110, the connecting circuit 140, and the periphery circuit 150 may be formed on the substrate 102 in the same process (e.g., a direct printing process). More specifically, a gravure off-set printing process may be performed, and a mesh-like pattern may be designed on the gravure, so as to directly from the sensing series 120, the sensing series 130, and the dummy electrodes 136 separately disposed in the sensing area 104. In meanwhile, the connecting circuit 140 and the periphery circuit 150 in the frame area 106 may also be printed on the substrate 102 according to design requirements. Accordingly, components of the sensing unit 110, the connecting circuit 140, and the periphery circuit 150 having required line widths, line thicknesses, and resistances may be obtained in one printing process. In addition, the line widths gradually increase from the sensing area 104 to the frame area 106. Moreover, based on the resistances as required, the line length or line width of the connecting pattern 142 may be designed to match the mesh electrodes 122 and 132 of the sensing unit 110, so as to reach a consistency among effective circuit resistances.

Figure 13A:
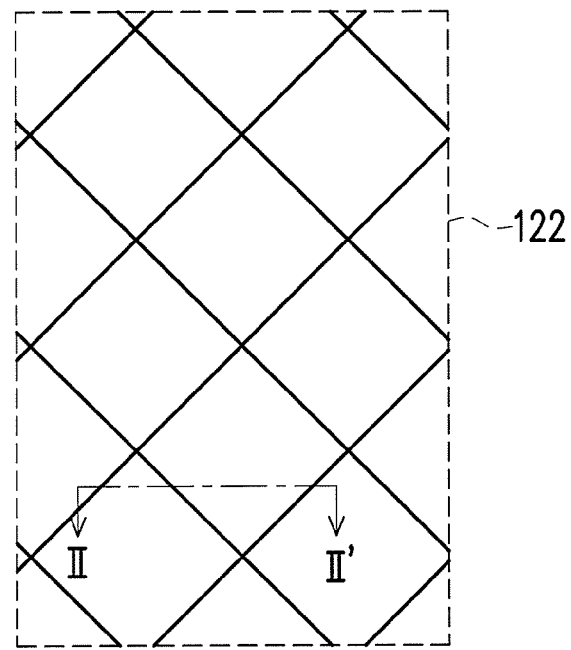
FIG. 13A is a partial enlarged view illustrating a mesh electrode according to an embodiment of the disclosure.
Figure 13B:
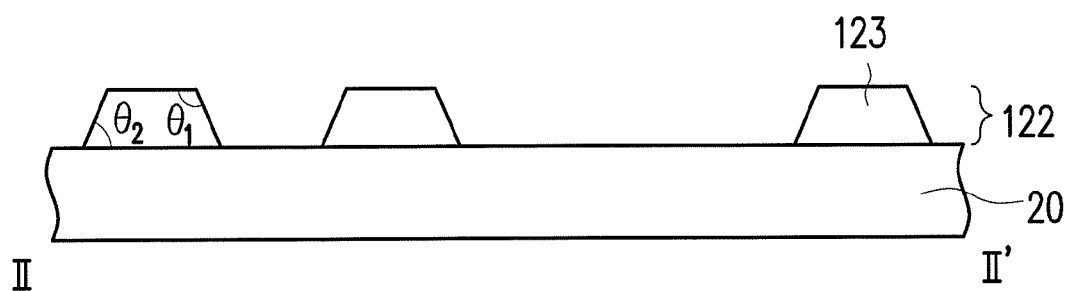
FIGS. 13B to 13D are respectively cross-sectional schematic views along Line II-II' of FIG. 13A.
Figure 13C:
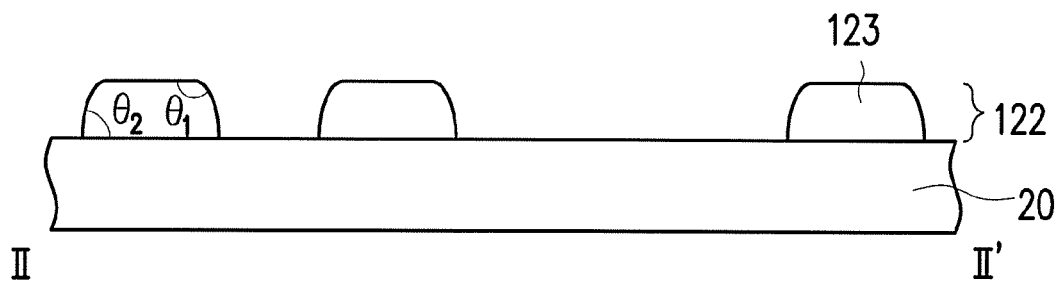
Figure 13D:
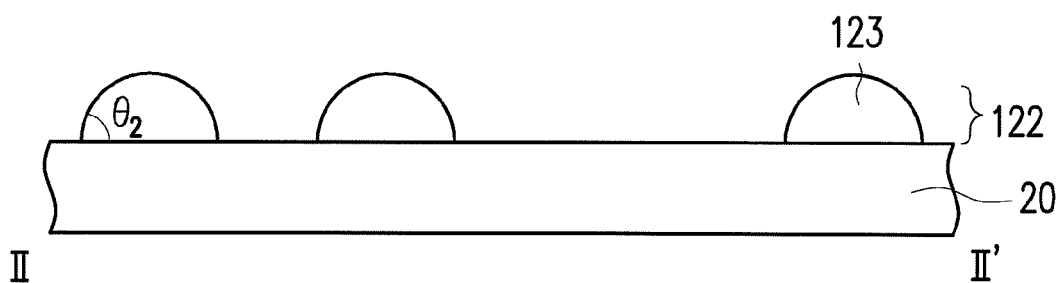
Figure 14:
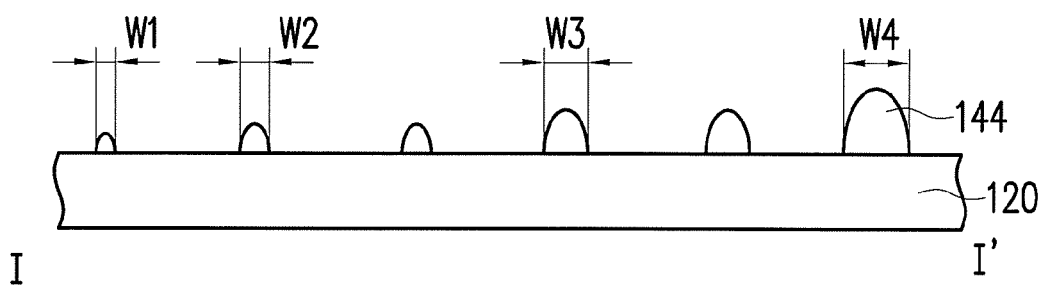
FIG. 14 is a cross-sectional schematic view along Line I-I' of FIG. 2.

In this embodiment, components such as the mesh electrodes 122 and 132, the connecting patterns 142, and the periphery wires 152 are formed by performing a printing process. Thus, taking the mesh electrode 122 on a first substrate 20 as an example, in a cross-section of a conductive line 123 thereof as shown in FIGS. 13B to 13D (FIGS. 13B to 13D are respectively schematic views along Line II-II' of FIG. 13A), a position where a top and a side connect has a lead angle $\theta_1$, or the top has a R value (that is radius of curvature), or an included angle between a bottom and the side is an acute angle $\theta_2$. On the contrary, in a cross-section of a conductive line foamed in a photolithography process, the included angle between the side and the bottom thereof is a normal angle or an obtuse angle due to over-etching, and is thus different from above. Also, under the same printing parameters (e.g., printing speed), the same ink material, and the same curing parameters (e.g., curing temperature), the line width and line thickness of the conductive line are positively correlated. In other words, if a conductive line is wider, it is also thicker, and if a conductive line is narrower, it is also finer. Thus, in an embodiment as shown in FIG. 14 (FIG. 14 is a cross-sectional view along Line I-I' of FIG. 2), taking the conductive line 144 of the connecting pattern 142 on the first substrate 20 as an example, the line width and line thickness of the conductive line 144 of the connecting pattern 142 are positively correlated, for example. Similarly, the line widths and line thicknesses of the mesh electrodes 122 and 132 and the periphery wires 152 are also positively correlated. A mean surface roughness (Ra) of the sensing unit 110, the connecting circuit 140 (the connecting pattern 142 or the conductive line 144), or the periphery circuit 150 framed through printing is in a range from about 10% to 50%. For example, the line thickness of the conductive line is 1 μm and the surface roughness thereof is in a range from 0.1 μm to 0.5 μm.

In other words, in accordance with different designs, the sensing unit 110, the connecting circuit 140, and the periphery circuit 150 that are different components may be manufactured in one printing process. The sensing structure 100 does not require processes such as vacuum deposition and photolithography, etching, laser, etc. Also, employing the direct printing process has advantages such as having simpler processes and lower cost for equipment, and being able to manufacture in a large area. Furthermore, the sensing structure 100 formed of a mesh has the advantages of having a preferable light transmittance, lower resistance, and preferable thin film uniformity, and is able to adjust printing patterns according to different designs. Besides, a roll-to-roll process may be performed to quickly manufacture in a large area, and the product may be used in flexible electronic circuits and components.

A material of the sensing structure 100 may be metallic, inorganic, or organic materials, etc. The metallic materials include various metals, various conductive inks (e.g., silver paste, copper paste, copper paste, etc.), various composite metal compounds, etc., the inorganic materials include metal oxides, (e.g., ITO, FTO, ZnO, AZO, and IZO, etc.), and the organic materials include conductive/conjugate polymers, carbon nanotube, graphene, and nano silver lines, etc.

Figure 8:
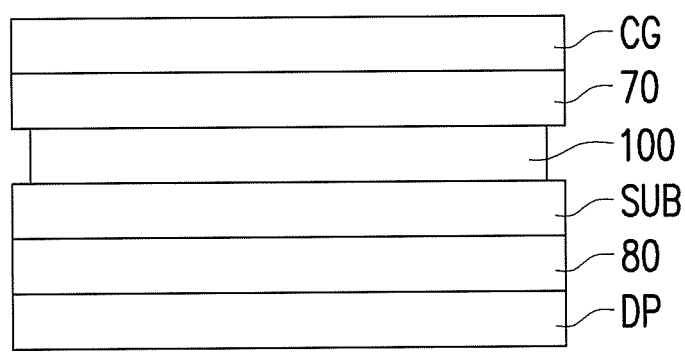
FIG. 8 is a schematic view illustrating a sensing device according to an embodiment of the disclosure.
Figure 9:
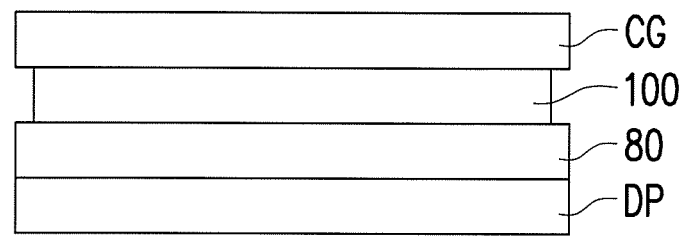
FIG. 9 is a schematic view illustrating a sensing device according to an embodiment of the disclosure.

The sensing structure 100 may be used in various sensing panels. Detailed description in this regard is provided in the following. FIG. 8 is a schematic view illustrating a sensing device according to an embodiment of the disclosure. Referring to FIG. 8, a sensing device 10 includes a cover plate CG, a substrate SUB, the sensing structure 100, adhering layers 70 and 80, and a display panel DP. In this embodiment, the sensing structure 100 is disposed on the substrate SUB, for example. The sensing structure 100 is bonded to the cover plate CG through the adhering layer 70, and the substrate SUB is bonded to the display panel DP through the adhering layer 80. In this embodiment, when the substrate SUB is a glass substrate, the structure is also referred to as a GG structure, and when the substrate SUB is a thin film substrate, the structure also referred to as a GF structure. In an embodiment, as shown in FIG. 9, the sensing structure 100 may also be directly disposed on the cover plate CG, and the adhering layer 70 and the substrate SUB may be omitted. Such structure is also referred to as an OGS structure.

Figure 10:
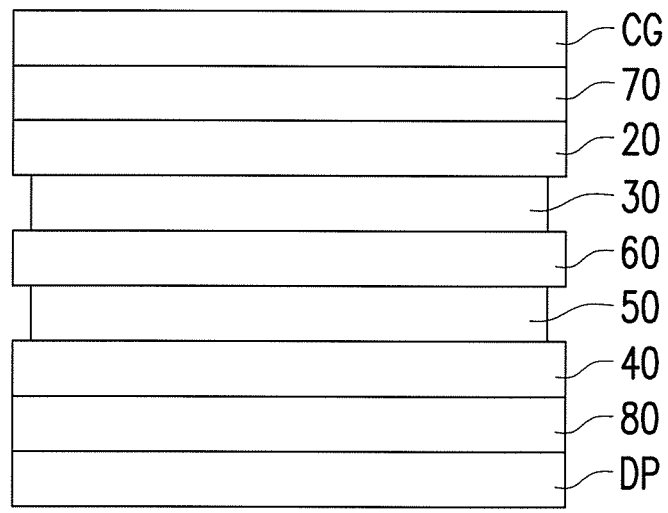
FIG. 10 is a schematic view illustrating a sensing device according to an embodiment of the disclosure.

In the above embodiment, the sensing structure 100 is described as being disposed on the same surface of the same substrate SUB. However, the disclosure is not limited thereto. FIG. 10 is a schematic view illustrating a sensing device according to an embodiment of the disclosure. The sensing structure 10 includes the cover plate CG, the first substrate 20, a first sensing layer 30, a second substrate 40, a second sensing layer 50, the adhering layers 60, 70, and 80, and the display panel DP. In addition, the first sensing layer 30 includes the sensing series 120 and the corresponding connecting circuit 140 and periphery circuit 150, the second sensing layer 50 includes the sensing series 130 and the corresponding connecting circuit 140 and periphery circuit 150. In other words, the first sensing layer 30 and the second sensing layer 50 form the sensing unit 110. In this embodiment, the first sensing layer 30 is disposed on the first substrate 20 and is bonded to the cover plate CG through the adhering layer 70. The second sensing layer 50 is disposed on the second substrate 40 and bonded to the display panel DP through the adhering layer 80. The adhering layer 60 is disposed between the first sensing layer 30 and the second sensing layer 50, so as to adhere the first sensing layer 30 and the second sensing layer 50. The adhering layer 60 may be in a mesh-like shape, and is configured to adhere positions where series of the first sensing layer 30 and the second sensing layer 50 intersect. In this embodiment, when the first substrate 20 and the second substrate 40 are glass substrates, such structure is also referred to as a GG2 structure. When the first substrate 20 and the second substrate 40 are thin film substrates, such structure is also referred to as a GFF structure.

Figure 11:
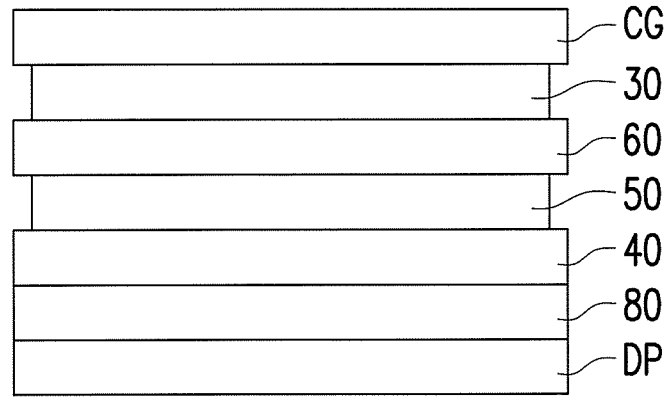
FIG. 11 is a schematic view illustrating a sensing device according to an embodiment of the disclosure.
Figure 12:
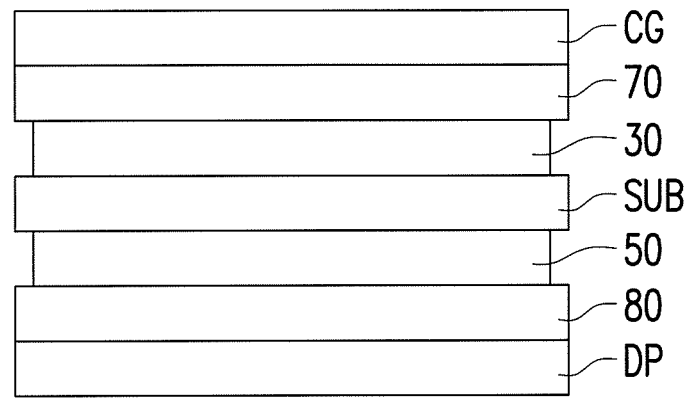
FIG. 12 is a schematic view illustrating a sensing device according to an embodiment of the disclosure.

In this embodiment, the first sensing layer 30 and the second sensing layer 50 are respectively disposed on the first substrate 20 and the second substrate 40. However, the disclosure is not limited thereto. For example, in an embodiment as shown in FIG. 11, the first sensing layer 30 may also be directly disposed on the cover plate CG, and the first substrate 20 and the adhering layer 70 are omitted. Such structure is also referred to as a G1F structure. Alternatively, as shown in FIG. 12, in an embodiment, the first sensing layer 30 and the second sensing layer 50 may be disposed on opposite surfaces of the same substrate SUB. When the substrate SUB is a thin film substrate, such structure is also referred to as a GF2.

Moreover, the above embodiments are described as disposing the first sensing layer 30 and the second sensing layer 50 on the display panel DP and adhering the components with the adhering layers as examples. Such structures are generally referred to as on-cell or out-cell sensing panel structures. However, the disclosure is not limited thereto. For example, in an embodiment, at least one of the first sensing layer 30 and the second sensing layer 50 may be disposed inside the display panel DP, so as to form a structure referred to as an in-cell structure.

It should be noted in particular that the sensing structures of the above embodiments may be used in a touch sensing structure. However, the disclosure is not limited thereto.

In view of the foregoing, in the connecting pattern of the disclosure, the line width at the part that connects the periphery circuit is greater than the line width at the part that connects the sensing unit, or the mesh density at the part that connects the periphery circuit is greater than the mesh density at the part that connects the sensing unit. Accordingly, a buffer area is provided between a finer line width at the sensing unit and a thicker line width at the periphery circuit. In this way, a sudden change from a finer line width to a thicker line width may be prevented, so as to avoid disconnection at a position where the sensing unit and the periphery circuit are connected. Moreover, a plurality of connecting lines may be disposed between a single sensing series and the periphery wire, so as to avoid a short circuit due to disconnection of a single connecting line. Accordingly, the sensing structure has a preferable qualified rate and sensing ability.

In an embodiment, manufacturing the components of the sensing structure by performing a direct printing process, for example, allows to manufacture the mesh electrodes, connecting patterns, and periphery wires in one process. Moreover, by using a metallic line having a fine line width, the requirements on transmittance and conductivity of a sensing element in the sensing area are met at the same time, and a design requirement of a narrow line width in the periphery area is met as well. According, the sensing structure according to an embodiment of the disclosure has the advantages of having a preferable light transmittance, lower resistance, and preferable thin film uniformity, and is able to adjust printing patterns according to different designs. Moreover, the sensing structure according to an embodiment of the disclosure has the advantages of having simpler manufacturing processes, lower cost for equipment, and being able to manufacture in a large area, and may be broadly used in flexible electronic circuits and components. Moreover, the sensing structure may be applied in the roll-to-roll process to manufacture quickly, so as to meet the demands on displays nowadays and improve the performance of mass production.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A sensing structure, comprising:
   a sensing unit;
   a periphery circuit; and
   a connecting circuit, comprising a connecting pattern and configured to connect the sensing unit and the periphery circuit, wherein the connecting pattern has at least two line widths, the line width of a part of the connecting pattern that connects the periphery circuit is greater than the line width of a part of the connecting pattern that connects the sensing unit, and a line thickness of the connecting pattern is increased as the line width of the connecting pattern is increased.

2. The sensing structure as claimed in claim 1, wherein the sensing unit comprises a sensing series, the sensing series extends in a direction and comprises a plurality of mesh electrodes, and a minimum line width of the connecting pattern is greater than or equal to a line width of each of the mesh electrodes.

3. The sensing structure as claimed in claim 2, wherein the sensing unit further comprises a plurality of dummy electrodes, and the dummy electrodes are configured between the mesh electrodes and disposed in an electrically floating state.

4. The sensing structure as claimed in claim 3, wherein each of the dummy electrodes has a mesh structure.

5. The sensing structure as claimed in claim 1, wherein the sensing unit, the connecting circuit, and the periphery circuit are integrally formed.

6. The sensing structure as claimed in claim 1, wherein the periphery circuit comprises a periphery wire, and a maximum line width of the connecting pattern is smaller than or equal to a line width of the periphery wire.

7. The sensing structure as claimed in claim 1, wherein the connecting pattern comprises a mesh pattern.

8. The sensing structure as claimed in claim 1, wherein the connecting pattern comprises a first conductive line, the first conductive line connects the sensing unit and the periphery circuit, and line widths of the first conductive line gradually increases from the sensing unit toward the periphery circuit, and a minimum line width of the first conductive line is greater than or equal to a line width of the sensing unit and a maximum line width of the first conductive line is smaller than or equal to a line width of the periphery circuit.

9. The sensing structure as claimed in claim 1, wherein the connecting circuit further comprises at least one second conductive line at a terminal part of the sensing unit, and the at least one second conductive line connects the sensing unit and the periphery circuit.

10. The sensing structure as claimed in claim 9, wherein the at least one second conductive line overlaps the terminal part of the sensing unit, and a line width of the at least one second conductive line is greater than or equal to a line width of the sensing unit.

11. The sensing structure as claimed in claim 1, wherein the line widths of the connecting pattern gradually increase from the sensing unit toward the periphery circuit.

12. The sensing structure as claimed in claim 1, wherein in a cross-section of the connecting pattern, a position where a top and a side connect has a lead angle, and an included angle between the side and a bottom is an acute angle.

13. The sensing structure as claimed in claim 1, wherein a mean surface roughness is equal to surface roughness of the sensing unit, the connecting pattern, or the periphery circuit divided by a thickness of the sensing unit, the connecting pattern, or the periphery circuit and is in a range from 10% to 50%.

14. A sensing structure, comprising:
a sensing unit;
a periphery circuit; and
a connecting circuit, comprising a connecting pattern and configured to connect the sensing unit and the periphery circuit, wherein the connecting pattern comprises a mesh pattern, the mesh pattern has at least two line widths and at least two mesh densities, the mesh density of a part of the mesh pattern that connects the periphery circuit is greater than the mesh density of a part of the mesh pattern that connects the sensing unit, and a line thickness of the mesh pattern is increased as the line width of the mesh pattern is increased.

15. The sensing structure as claimed in claim 14, wherein the sensing unit comprises a sensing series, the sensing series extends in a direction and comprises a plurality of mesh electrodes, and a mesh density of each of the mesh electrodes is lower than or equal to a minimum mesh density of the mesh pattern.

16. The sensing structure as claimed in claim 15, wherein the sensing unit further comprises a plurality of dummy electrodes, and the dummy electrodes are configured between the mesh electrodes and disposed in an electrically floating state.

17. The sensing structure as claimed in claim 16, wherein each of the dummy electrodes has a mesh structure.

18. The sensing structure as claimed in claim 14, wherein a line width of the mesh pattern is uniform, or line widths of the mesh pattern gradually increase from the sensing unit toward the periphery circuit.

19. The sensing structure as claimed in claim 14, wherein the sensing unit, the connecting circuit, and the periphery circuit are integrally formed.

20. The sensing structure as claimed in claim 14, wherein the connecting circuit further comprises at least one first conductive line disposed between the mesh pattern and the periphery circuit, the at least one first conductive line connects the mesh pattern and the periphery circuit, and line widths of the at least one first conductive line gradually increase from the mesh pattern toward the periphery circuit, and a maximum line width of the at least one first conductive line is smaller than or equal to a line width of the periphery circuit.

21. The sensing structure as claimed in claim 14, wherein the connecting circuit further comprises at least one second conductive line at a terminal part of the sensing unit, and the at least one second conductive line connects the sensing unit and the periphery circuit.

22. The sensing structure as claimed in claim 21, wherein the at least one second conductive line overlaps the terminal part of the sensing unit.

23. The sensing structure as claimed in claim 14, wherein the mesh densities of the mesh pattern gradually increase from the sensing unit toward the periphery circuit.

24. The sensing structure as claimed in claim 14, wherein in a cross-section of the mesh pattern, a position where a top and a side connect has a lead angle, and an included angle between the side and a bottom is an acute angle.

25. The sensing structure as claimed in claim 14, wherein a mean surface roughness is equal to surface roughness of the sensing unit, the connecting pattern, or the periphery circuit divided by a thickness of the sensing unit, the connecting pattern, or the periphery circuit and is in a range from 10% to 50%.

26. A sensing structure, comprising:
a sensing unit, comprising a single sensing series;
a periphery circuit, comprising a periphery wire; and
a connecting circuit, comprising a plurality of first conductive lines, wherein the first conductive lines respectively have at least two line widths and are disposed between the single sensing series and the periphery wire and connect the single sensing series and the periphery wire, wherein a line thickness of the first conductive line is increased as the line width of the first conductive line is increased.

27. The sensing structure as claimed in claim 26, wherein the single sensing series extends in a direction and comprises a plurality of mesh electrodes.

28. The sensing structure as claimed in claim 27, wherein the sensing unit further comprises a plurality of dummy electrodes, and the dummy electrodes are configured between the mesh electrodes and disposed in an electrically floating state.

29. The sensing structure as claimed in claim 28, wherein each of the dummy electrodes has a mesh structure.

30. The sensing structure as claimed in claim 26, wherein the connecting circuit further comprises at least one second conductive line, the at least one second conductive line is located at a terminal part of the single sensing series, and the at least one second conductive line connects the single sensing series and the first conductive lines.

31. The sensing structure as claimed in claim 30, wherein the at least one second conductive line overlaps the terminal part of the single sensing series.

32. The sensing structure as claimed in claim 26, wherein in a cross-section of the first conductive line, a position where a top and a side connect has a lead angle, and an included angle between the side and a bottom is an acute angle.

33. The sensing structure as claimed in claim 26, wherein a mean surface roughness is equal to surface roughness of the sensing unit, the connecting pattern, or the periphery circuit divided by a thickness of the sensing unit, the connecting pattern, or the periphery circuit and is in a range from 10% to 50%.

* * * * *